(12) United States Patent
Pertierra et al.

(10) Patent No.: US 11,536,906 B2
(45) Date of Patent: Dec. 27, 2022

(54) MODAL-NOISE MITIGATOR AND ASSOCIATED METHOD

(71) Applicant: DOLBY LABORATORIES LICENSING CORPORATION, San Francisco, CA (US)

(72) Inventors: Juan P. Pertierra, Fishers, IN (US); Barret Lippey, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 108 days.

(21) Appl. No.: 17/253,593

(22) PCT Filed: Jun. 18, 2019

(86) PCT No.: PCT/US2019/037744
§ 371 (c)(1),
(2) Date: Dec. 17, 2020

(87) PCT Pub. No.: WO2019/246106
PCT Pub. Date: Dec. 26, 2019

(65) Prior Publication Data
US 2021/0255390 A1    Aug. 19, 2021

Related U.S. Application Data

(60) Provisional application No. 62/686,441, filed on Jun. 18, 2018.

(30) Foreign Application Priority Data

Sep. 17, 2018   (EP) ..................................... 18194857

(51) Int. Cl.
*G02B 6/26*     (2006.01)
*G02B 6/028*    (2006.01)
(Continued)

(52) U.S. Cl.
CPC ........... *G02B 6/268* (2013.01); *G02B 6/0288* (2013.01); *G02B 6/14* (2013.01); *G02B 27/48* (2013.01);
(Continued)

(58) Field of Classification Search
CPC ........ G02B 6/268; G02B 6/0288; G02B 6/14; G02B 27/48; G03B 21/2033; G03B 21/208
See application file for complete search history.

(56) References Cited

U.S. PATENT DOCUMENTS 11,364,032 B2 *   6/2022   Cabrera Aquino .......................... A61B 17/12013
2003/0228098 A1  12/2003  Sidorovich
(Continued)

FOREIGN PATENT DOCUMENTS

CN   201622390 U    11/2010
CN   106933008 B    7/2017
(Continued)

OTHER PUBLICATIONS

Davis, et al "Humans Perceive Flicker Artifacts at 500 Hz" Scientific Reports, 2015.
(Continued)

*Primary Examiner* — Ellen E Kim

(57) ABSTRACT

A method for mitigating modal noise includes applying a time-varying mechanical force to a fiber segment of the multimode optical fiber in at least a first direction orthogonal to a fiber axis of the multimode optical fiber within the fiber segment. A modal-noise mitigator for a multimode optical fiber includes an actuator configured to apply a time-varying mechanical force to a fiber segment of the multimode optical fiber in at least a first direction orthogonal to a fiber axis of the multimode optical fiber within the fiber segment.

25 Claims, 3 Drawing Sheets

(51) Int. Cl.
*G02B 6/14* (2006.01)
*G02B 27/48* (2006.01)
*G03B 21/20* (2006.01)

(52) U.S. Cl.
CPC ....... *G03B 21/208* (2013.01); *G03B 21/2033* (2013.01)

(56) References Cited

U.S. PATENT DOCUMENTS

| | | | |
|---|---|---|---|
| 2010/0290738 A1 | 11/2010 | Yan | |
| 2012/0140234 A1 | 6/2012 | Masterson | |
| 2015/0109618 A1 | 4/2015 | Howell | |
| 2015/0233701 A1* | 8/2015 | Hogan | G01B 9/02087 356/479 |
| 2016/0018327 A1* | 1/2016 | Hogan | G01B 9/02027 356/479 |
| 2016/0146998 A1 | 5/2016 | Tissot | |
| 2017/0045690 A1* | 2/2017 | Mahadevan | G01J 3/0218 |

FOREIGN PATENT DOCUMENTS

| | | |
|---|---|---|
| CN | 107203085 B | 9/2017 |
| CN | 108139662 A | 6/2018 |
| DE | 3430766 | 3/1986 |
| JP | 2003156698 | 5/2003 |

OTHER PUBLICATIONS

Ha, W. et al "Speckle Reduction in Multimode Fiber with a piezoelectric Transducer in Radial Vibration for Fiber Laser Marking and Display Applications", Proc. SPIE International Conference on Optical Instruments and Technology, vol. 6873, Feb. 25, 2008.

* cited by examiner

500

Steps may be performed simultaneously.

Apply a time-varying mechanical force to a fiber segment of the multimode optical fiber in at least a first direction orthogonal to a fiber axis of the multimode optical fiber within the fiber segment.

- Bend the fiber segment. — 511
- Compress the fiber segment. — 512
- Deform at least one of a cladding and a core of the fiber segment. — 514
- Apply the time-varying mechanical force to an elastic material in which the fiber segment is embedded. — 516
- Induce a time variation on modal noise of the laser light emitted by an output end of the multimode optical fiber. — 518

— 510

Apply two time-varying mechanical forces to the fiber segment in two respective non-parallel directions that are both orthogonal to the fiber axis.

- Dither the fiber segment in each of the two non-parallel directions. — 522

— 520

Generate the laser light. — 532

Couple the laser light to an input end of the multimode optical fiber. — 534

Project at least a portion of the laser light emitted by an output end of the multimode optical fiber to form an image on a screen. — 536

- Maintain the output end at a stationary position relative to the input end. — 537

— 530

Maintain, while applying the time-varying mechanical force, an output end of the multimode optical fiber at a position, relative to an input end of the multimode optical fiber, that is independent of the time-varying mechanical force. — 540

FIG. 5

MODAL-NOISE MITIGATOR AND ASSOCIATED METHOD

CROSS-REFERENCE TO RELATED APPLICATIONS

This patent application claims the benefit of priority from U.S. Provisional Patent Application No. 62/686,441, filed on 18 Jun. 2018; European Patent Application No. 18194857.1, filed on 17 Sep. 2018, each one incorporated by reference in its entirety.

BACKGROUND

Laser-based digital projectors are gradually replacing lamp-based digital projectors for cinema applications. Depending on design and implementation, laser-based digital projectors may have advantages over lamp-based projectors such as enhanced picture quality, longer life, improved reliability, and lower power draw. However, laser-based digital projectors may introduce artifacts in projected images.

SUMMARY OF THE EMBODIMENTS

Embodiments disclosed herein mitigate the aforementioned image artifacts associated with laser-based digital projectors. In a first aspect, a method for mitigating modal noise in light from a multimode optical fiber includes applying a time-varying mechanical force to a fiber segment of the multimode optical fiber in at least a first direction orthogonal to a fiber axis of the multimode optical fiber within the fiber segment. In a second aspect, a modal-noise mitigator for a multimode optical fiber includes an actuator configured to apply a time-varying mechanical force to a fiber segment of the multimode optical fiber in at least a first direction orthogonal to a fiber axis of the multimode optical fiber within the fiber segment.

BRIEF DESCRIPTION OF THE FIGURES

FIG. 5 is a flowchart illustrating a method for mitigating modal noise in light from a multimode optical fiber, in an embodiment.

DETAILED DESCRIPTION OF THE EMBODIMENTS

Figure 1:
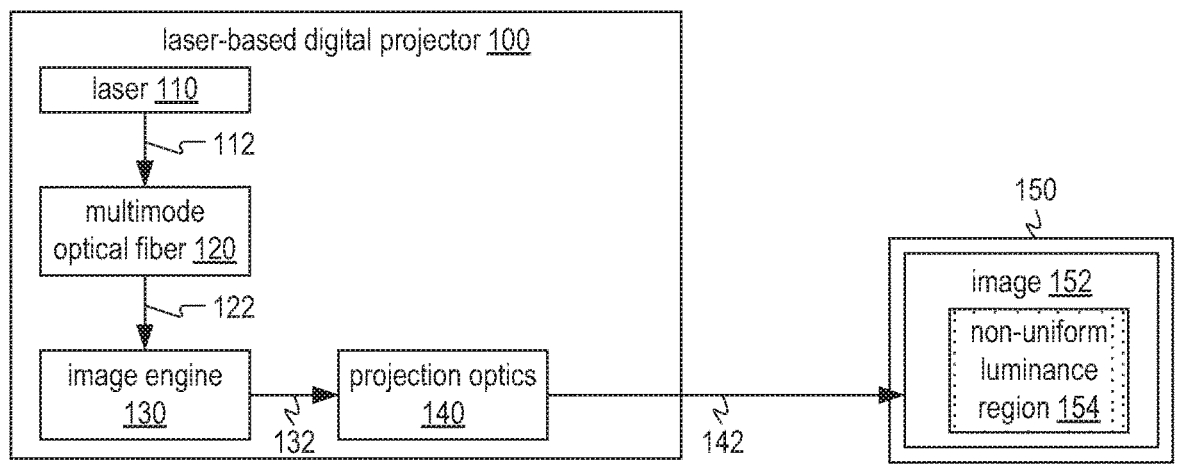
FIG. 1 is a schematic of a laser-based digital projector that includes a multimode optical fiber.

FIG. 1 is a schematic of a laser-based digital projector 100, which includes a laser 110, a multimode optical fiber 120, an image engine 130, and projection optics 140. Laser 110 generates light 112, which multimode optical fiber 120 guides and outputs as light 122, which is received by image engine 130. Image engine 130 imparts an image onto light 122 to produce spatially-modulated light 132. Projection optics 140 projects at least part of spatially-modulated light 132 as projected light 142, which propagates toward a screen 150, which displays an image 152. A problem with such laser-based digital projectors is that image 152 includes artifacts, as represented by a non-uniform luminance region 154 where luminance should be constant. Non-uniform luminance region 154 may by caused by modal noise of multimode optical fiber 120.

Figure 2:
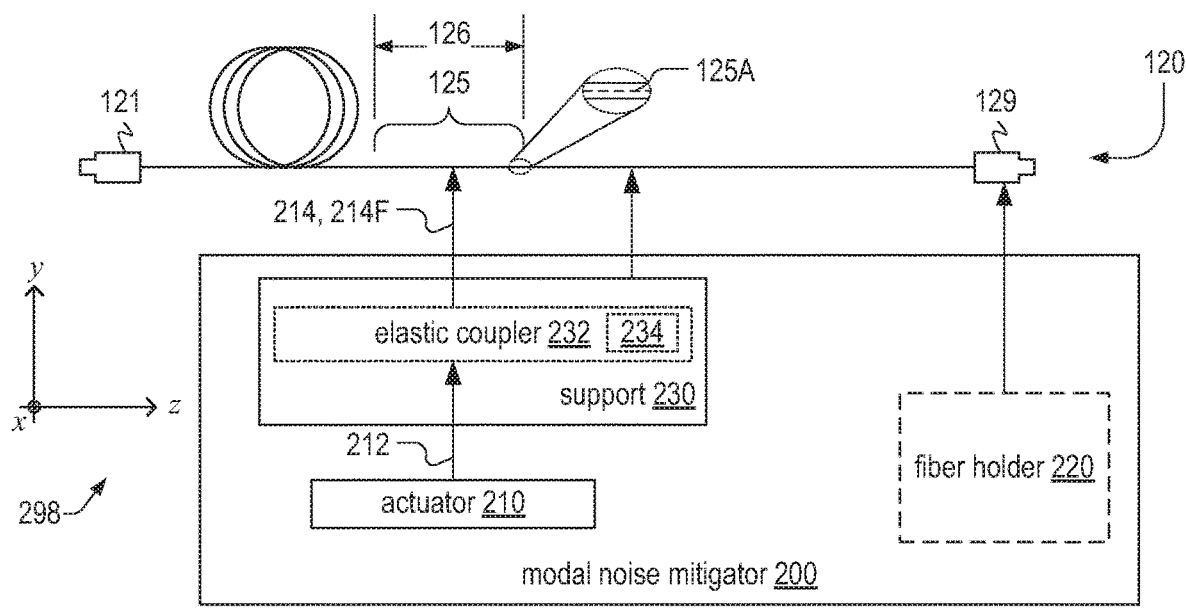
FIG. 2 is a schematic of a modal-noise mitigator for the multimode optical fiber of FIG. 1, in an embodiment.

FIG. 2 is a schematic of a modal-noise mitigator 200 for multimode optical fiber 120, hereinafter "fiber 120." Modal-noise mitigator 200 includes an actuator 210 and may also optionally include a fiber holder 220 and a support 230. Modal-noise mitigator 200 includes an elastic coupler 232. For example, support 230 may include elastic coupler 232. Elastic coupler 232 may include an elastic material 234.

Fiber 120 includes an input end 121, an output end 129, and a fiber segment 125 therebetween. At least one of input end 121 and output end 129 may be connectorized. Fiber segment 125 has a fiber axis 125A. The direction of fiber axis 125A, for example, at the beginning and/or end of fiber segment 125, defines a z direction of a coordinate system 298, Herein and unless stated otherwise, references to directions or planes denoted by at least one of x, y, or z refer to coordinate system 298.

Actuator 210 may be a vibration motor, an eccentric rotary-mass actuator, a linear resonant actuator, a piezoelectric actuator, or a combination thereof. Actuator 210 is configured to apply a time-varying mechanical force 214 to fiber segment 125 in a first direction orthogonal to fiber axis 125A. The first direction is the x direction, for example. Time-varying mechanical force 214 may include two orthogonal components, in the x and y directions for example, that are each orthogonal to fiber axis 125A. For improved modal-noise reduction and mechanical isolation of output end 129 from time-varying mechanical force 214, fiber segment 125 may be closer to input end 121 than to output end 129.

Fiber segment 125 has a length 126, which is, for example, between five millimeters and fifty centimeters. Increasing length 126 may decrease a minimum amplitude of time-varying mechanical force 214 required to adequately reduce modal noise, for example, when mechanical force 214 is applied along the entire length of fiber segment 125. A lower limit of length 126, e.g., five millimeters, may correspond to when the minimum amplitude of time-varying mechanical force 214 is sufficiently large to damage fiber segment 215. Elastic coupler 232 may at least partially define a lower limit of length 126, for example, one corresponding to a minimum spatial dimension of elastic material 234 such that elastic material maintains its shape and/or elastic properties. This lower limit of length 126 may be five millimeters.

Time-varying mechanical force 214 may have a temporal fundamental frequency 214F that exceeds a flicker fusion threshold, sixty-five hertz, for example. Temporal fundamental frequency 214F may exceed a flicker threshold corresponding to images with high spatial-frequency content. An example of such a flicker threshold is five-hundred hertz, as described by Davis et al., "Humans perceive flicker artifacts at 500 Hz," *Scientific Reports*, 2015; 5:7861.

Image engine 130 may include an array of micro-electro-mechanical (MEMs) mirrors that are configurable to switch at a plurality of frequencies. Differences between pairs of frequencies of the plurality of frequencies correspond to a plurality of beat frequencies. To avoid resonances, which potentially degrade image quality of image 152, temporal fundamental frequency 214F may satisfy one or more of the following conditions: (a) frequency 214F does not correspond to any such beat frequencies, (b) frequency 214F is at least five times greater than any such beat frequencies, and (c) frequency 214F varies in time such that if it does equal a beat frequency for a period of time, the period of time is less than the reciprocal of a flicker fusion threshold.

Time-varying mechanical force 214 on fiber 120 imposes a time variation on non-uniform luminance region 154 such that non-uniform luminance region 154 is less perceivable to a viewer of screen 150. In one example, time-varying mechanical force 214 results in "scrambling" non-uniform luminance region 154 such that non-uniform luminance region 154 temporally varies in a random or pseudorandom fashion. Time-varying mechanical force 214 may scramble non-uniform luminance region 154 by changing at least one of (a) a cross-sectional shape of fiber segment 125, (b) a local curvature of fiber segment 125, (c) a refractive index of fiber segment 125, and (d) a length of fiber segment 125. Cross-sectional shape and refractive index may refer to either or both of the core and the cladding of fiber segment 125. Altering fiber segment 125 in such a manner results in the allowed propagating modes of fiber segment 125 being a time-varying function determined by time-varying mechanical force 214.

When modal-noise mitigator 200 includes fiber holder 220, fiber holder 220 is configured to maintain output end 129 at a position that is independent of the time-varying mechanical force 214. This position is, for example, stationary relative to one or both of input end 121 (FIG. 2) and image engine 130 (FIG. 1).

In embodiments of modal-noise mitigator 200 that include support 230, support 230 is configured to hold fiber segment 125. When support 230 includes elastic coupler 232, elastic coupler 232 mechanically couples actuator 210 to fiber segment 125, such that actuator 210 applies, via elastic coupler 232, time-varying mechanical force 214 to fiber segment 125. In an example, actuator 210 applies a time-varying mechanical force 212 to elastic coupler 232, such that elastic coupler 232 applies time-varying mechanical force 214 to fiber segment 125. Time-varying mechanical force 212 has both a magnitude and direction, each of which may vary in time.

When elastic coupler 232 includes an elastic material 234, elastic material 234 may have a Young's modulus between one kilopascal and ten megapascals. Elastic material 234 may include, or be formed of, a solid foam, a gel, or a combination thereof. Actuator 210 may be at least partially embedded in elastic coupler 232 and/or elastic material 234.

Fiber segment 125 may be at least partially embedded, radially and/or longitudinally, in elastic coupler 232 and/or elastic material 234. For example, elastic material 234 is partially or completely radially surround fiber segment 125, that is, about the z axis. Along the z axis, the length of fiber segment 126 at least partially embedded (radially) in elastic material 234 may be less than or equal to length 126 of fiber segment 125. Length 126 may be defined by the length of fiber 120 that is at least partially embedded in elastic material 234.

Actuator 210 and elastic coupler 232 may be configured such that forces 212 and 214 differ in at least one of amplitude, fundamental temporal frequency, and net direction. For example, force 212 may have a non-zero x component and a zero y component ($F_x^{212} \neq 0$, $F_y^{212} = 0$), while force 214 may have, via modification by elastic coupler 232, both a non-zero x component and a non-zero y component. Elastic coupler 232 may have an oblique surface with respect to a direction of force 212. For example, elastic coupler 232 may have an oblique surface that is neither parallel nor perpendicular to the x-y plane and the y-z plane such that, even when $F^{212} \neq 0$ and $F_y^{212} = 0$, force 214 includes both an x and a y component.

Modal-noise mitigator 200 may be configured to mitigate non-uniform luminance region 154 by compressing fiber segment 125. In an embodiment, elastic coupler 232 at least partially surrounds fiber segment 125 in a plane perpendicular to fiber axis 125A, and actuator 210 is configured to compress fiber segment 125 via application of time-varying mechanical force 212.

Modal-noise mitigator 200 may be configured to mitigate non-uniform luminance region 154 by bending fiber segment 125. In an embodiment, elastic coupler 232 at least partially surrounds fiber segment 125, and actuator 210 is configured to bend fiber segment 125 via application of time-varying mechanical force 212

Figure 3:
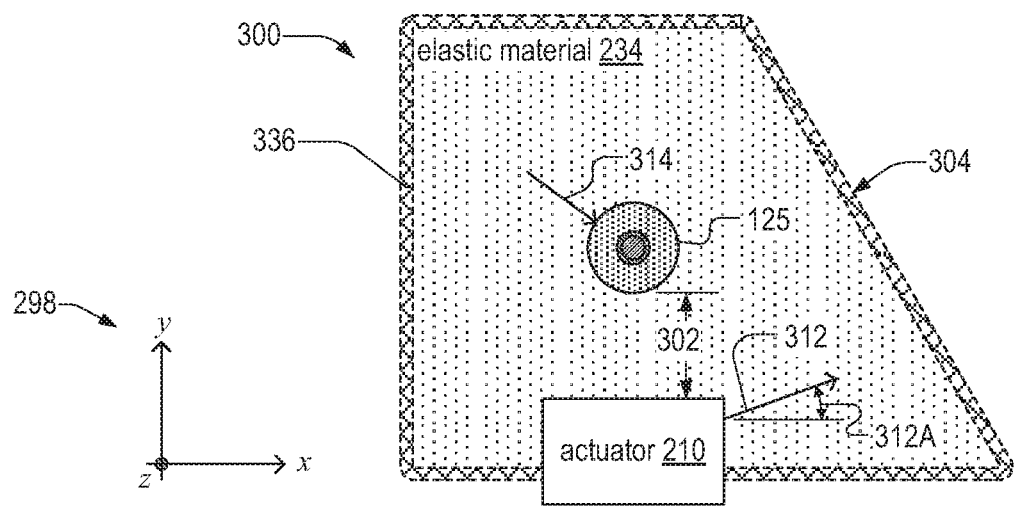
FIG. 3 is a cross-sectional view of fiber segment in an elastic coupler of the modal-noise mitigator of FIG. 2, in an embodiment.

FIG. 3 is a cross-sectional view of fiber segment 125 in an elastic coupler 300, which is an example of elastic coupler 232. The cross-sectional view of FIG. 3 is parallel to the x-y plane. Actuator 210 is configured to impart a time-varying mechanical force 312 on electric coupler 300 such that elastic coupler 300 applies a time-varying mechanical force 314 to fiber segment 125. Forces 312 and 314 are examples of time-varying mechanical forces 212 and 214, respectively. Time-varying mechanical force 312 has a direction corresponding to an angle 312A with respect to the x-axis. One or both of angle 312A and the magnitude of time-varying mechanical force 312 may vary in time.

Actuator 210 may be embedded or partially embedded in elastic coupler 300. Within elastic coupler 300, optical fiber segment 125 and actuator 210 are separated by a distance 302, which may be between twenty and thirty millimeters to provide sufficient dampening of mechanical force 312, e.g., when elastic material 234 has a Young's modulus between one kilopascal and ten megapascals. Distance 302 may be less than twenty millimeters or greater than thirty millimeters without departing from the scope of the present embodiments.

Elastic coupler 300 includes elastic material 234, and may also include an enclosure 336 that at least partially surrounds elastic material 234. Enclosure 336 is, for example, a tube filled with elastic material 234 or a tube that houses elastic material 234. Fiber segment 125 may be suspended within elastic material 234. Fiber segment 125 can dither, vibrate or bend within elastic material 234. For example, fiber segment 125 may dither, vibrate or bend in at least a direction orthogonal to fiber axis 125A or in any multiple non-parallel directions orthogonal to fiber axis 125A. Elastic material 234 may at least partially surround fiber segment 125 in a plane perpendicular to fiber axis 125A. In other words, fiber segment 125 is floating within the elastic material.

Time-varying mechanical force 312 may be one-dimensional, e.g., along the x direction as illustrated in FIG. 3. Time-varying mechanical force 312 is one-dimensional when, for example, angle 312A equals either one of two values at any instant, the two values differing by 180° in the x-y plane. Elastic coupler 300 may be configured, via one or both of its shape and material, such that the effect of mechanical force 312 on elastic coupler 300 results in time-varying mechanical force 314 having both x and y components, such that fiber segment 125 may vibrate, bend, and/or dither in one or both of the x and y directions. To facilitate such coupling between x and y motion when mechanical force 312 has a single direction component, elastic coupler 300 may include an oblique surface 304, which is configured to be oblique to the one dimension of time-varying force 312. Since fiber segment 125 is suspended within the elastic material, when the time-varying mechanical force is applied to the elastic material, the elastic material deforms. Deformation propagates through the elastic material and reaches the fiber segment suspended therein. The fiber segment can bend, vibrate or dither within the elastic material under exertion of the time-varying mechanical force on or inside the elastic material. In other words, the time-varying mechanical force is applied to the fiber segment via the elastic coupler, e.g. the elastic material of the elastic coupler. Bending, vibration or dithering can occur for example in any direction orthogonal to the fiber axis. The elastic material damps the applied mechanical force. The elastic material damps the movements of the fiber segment facilitating thus the application of the time-varying mechanical force onto the fiber segment. Movements, e.g. bending, vibrating or dithering movements, of the fiber segment are originated by this damping force. Since fiber segment is suspended within the elastic material each cross-section of the fiber segment along the fiber axis is damped in a slightly different manner, helping randomizing movements of the fiber segment within the elastic material. For example, deformation of the elastic material is affected by the elasticity of the elastic material, reflections of the deformation from boundaries of the elastic material at each cross section of the fiber segment, etc. Randomization of the movements of the fiber segment through the elastic material improves mitigating the modal-noise in the multimode optical fiber.

Bidirectional vibrations, bending, or dithering may have an advantage over unidirectional bidirectional vibrations, bending, or dithering. For example, bidirectional vibrations, bending, or dithering may be more effective in randomizing non-uniform luminance region 154, and hence be more effective in mitigating said noise such that it is less visible to a human observer.

Properties of fiber 120 may determine amplitudes of dithering and bending imparted thereon via time-varying mechanical force 214. Time-varying mechanical force 214 may dither fiber segment 125 to sufficiently randomize non-uniform luminance region 154. When the dithering is sinusoidal with a dither amplitude $A_d$ and fundamental angular frequency $\omega$, the corresponding maximum acceleration is $A_d\omega^2$. Hence, dither amplitude $A_d$ and angular frequency $\omega$ may be determined such that time-varying mechanical force 214 applies sufficient force (via corresponding maximum acceleration $A_d\omega^2$) to sufficiently randomize non-uniform luminance region 154. The dither-amplitude exceeds a fiber core diameter of fiber 120, for example. The fiber core diameter is between fifty micrometers and eight hundred micrometers, for example.

Similarly, to sufficiently randomize non-uniform luminance region 154 via bending, time-varying mechanical force 214 may bend fiber segment 125 to a curvature $\kappa$ that is less than a maximum bend curvature $\kappa_{max}$ of fiber 120. Curvature $\kappa = R^{-1}$ where R denotes radius of curvature of fiber 120 and $\kappa_{max} = R_{min}^{-1}$, where $R_{min}$ is the minimum bend radius of fiber 120. Minimum bend radius $R_{min}$ is, for example, one hundred twenty times the cladding diameter of fiber 120. The cladding diameter is, for example, between one hundred micrometers and one millimeter.

Figure 4:
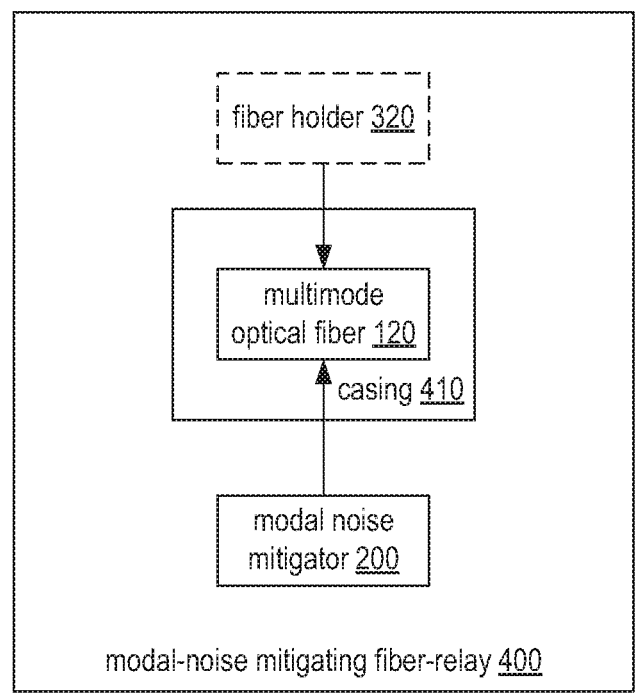
FIG. 4 is a schematic of a modal-noise mitigating fiber-relay, which includes the modal-noise mitigator of FIG. 2 and the multimode optical fiber of FIG. 1, in an embodiment.

FIG. 4 is a schematic of a modal-noise mitigating fiber-relay 400. Modal-noise mitigating fiber-relay 400 includes modal-noise mitigator 200, fiber 125, and a casing 410 that hermetically seals fiber 120 or a part of fiber 120 including at least fiber segment 125. Mechanical force 214 on fiber 120 may accelerate fiber 120's aging process and chance of failure. For example, repeated exposure to mechanical force 214 may prematurely form microscopic cracks in fiber 120, into which ambient water vapor can penetrate. Such penetration can potentially cause the cracks to expand and initiate performance degradation of fiber 120. Hermetically sealing at least fiber segment 125 with casing 410 mitigates this risk. Modal-noise mitigating fiber-relay 400 may also include one or more fiber holders 220 configured to fix positions of input end 121 and output end 129 relative to each other. One or more fiber holders 220 may be integrated into, or be separate from, modal-noise mitigator 200

FIG. 5 is a flowchart illustrating a method 500 for mitigating modal noise in light from a multimode optical fiber. Method 500 includes at least one of steps 510, 530, and 540. At least any two of steps 510, 530, and 540 may be performed simultaneously.

Step 510 includes applying a time-varying mechanical force to a fiber segment of the multimode optical fiber in at least a first direction orthogonal to a fiber axis of the multimode optical fiber within the fiber segment. In an example of step 510, actuator 210 applies time-varying mechanical force 214 to fiber segment 125 of fiber 120, FIG. 2. In this example, time-varying mechanical force 214 includes a component that is orthogonal the fiber axis of fiber 120 within fiber segment 125.

Step 510 may include at least one of steps 511, 512, 514, 516, and step 520. Step 511 includes bending the fiber segment; for example, actuator 210 bends fiber segment 125. Step 512 includes compressing the fiber segment; for example, actuator 210 compresses fiber segment 125. Step 514 includes deforming at least one of a cladding and a core of the fiber segment. In an example of step 514, actuator 210 deforms at least one of a cladding and a core of fiber segment 125.

Step 510 may include step 516 when the fiber segment is embedded in an elastic material. Step 516 includes applying the time-varying mechanical force to the elastic material. In an example of step 516, actuator 210 applies time-varying mechanical force 212 to elastic coupler 232, FIG. 2.

Step 518 includes inducing a time variation on modal noise of the laser light emitted by an output end of the multimode optical fiber. In an example of 518, actuator 210's applying time-varying mechanical force 214 to fiber segment 125 (step 510) induces a time variation on non-uniform luminance region 154, FIG. 1.

Step 520 includes applying two time-varying mechanical forces to the fiber segment in two respective non-parallel directions that are both orthogonal to the fiber axis. When step 510 includes step 520, each of the time-varying forces may be applied either simultaneously or alternatingly. At least one of time-varying mechanical forces may be sinusoidal. When both time-varying mechanical forces include respective sinusoidal components, the phases and fundamental frequencies of the respective sinusoidal components may be the same or may differ, e.g., for sufficiently randomizing non-uniform luminance region 154. In an example of step 520, actuator 210 applies time-varying mechanical force 214 to fiber segment 125, in which time-varying mechanical force 214 includes both an x component and a y component.

Step 520 may include step 522, which includes dithering the fiber segment in in each of the two respective non-parallel directions. In an example of step 522, actuator 210 dither fiber segment 125 in both the x and y directions, either simultaneously or alternatingly. Actuator 210 may dither fiber segment 125 in both (a) the ±x direction during a first plurality of time intervals, and (b) the ±y direction during a second plurality of time intervals interleaved with the first plurality of intervals.

Step 530 may include at least one of includes steps 532, 534, and 536. Step 532 includes generating the laser light. In an example of step 532, laser 110 generates light 112. Step 534 includes coupling the laser light to an input end of the multimode optical fiber. In an example of step 534, light 112 is coupled into input end 121 of fiber 120.

Step 536 includes projecting at least a portion of the laser light emitted by an output end of the multimode optical fiber to form an image on a screen. In an example of step 536, projection optics 140 projects projected light 142 to form image 152 on screen 150. Step 536 may include step 537, which includes maintaining the output end at a stationary position relative to the input end. In an example of step 537, fiber holder 220 maintains output end 129 at a stationary position relative to input end 121.

Step 540 includes, during application of the time-varying mechanical force in step 510, maintaining an output end of the multimode optical fiber at a position, relative to an input end of the multimode optical fiber, that is independent of the time-varying mechanical force. In an example of step 540, fiber holder 220 maintains output end 129 at a position, relative to input end 121, that is independent of time-varying mechanical force 214.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

Various aspects of the present invention may be appreciated from the following enumerated example embodiments (EEEs):

1. A modal noise mitigation method comprising:
    applying a time-varying mechanical force to a fiber segment of a multimode optical fiber in at least a first direction orthogonal to a fiber axis of the multimode optical fiber within the fiber segment.
2. The method of EEE 1, further comprising, while applying the time-varying mechanical force, maintaining an output end of the multimode optical fiber at a position that is independent of the time-varying mechanical force.
3. The method of EEE 2, in the step of maintaining, the position being stationary relative to an input end of the multimode optical fiber.
4. The method of any of EEEs 1-3, in the step of applying, the fiber segment being closer to an input end of the multimode optical fiber than to an output end of the multimode optical fiber.
5. The method of any of EEEs 1-4, the time-varying mechanical force having a temporal fundamental frequency exceeding sixty-five hertz.
6. The method of any of EEEs 1-5, the time-varying mechanical force having a temporal fundamental frequency exceeding five-hundred hertz.
7. The method of any of EEEs 1-6, the step of applying comprising applying two time-varying mechanical forces to the fiber segment in two respective non-parallel directions that are both orthogonal to the fiber axis.
8. The method of EEE 7, the step of applying the two time-varying mechanical forces comprising dithering the fiber segment in each of the two non-parallel directions.
9. The method of EEE 8, the dithering having an amplitude less than a core diameter of the optical fiber.
10. The method of any of EEEs 1-9, the step of applying the time-varying mechanical force comprising bending the fiber segment.
11. The method of any of EEEs 1-10, the step of applying the time-varying mechanical force comprising compressing the fiber segment.
12. The method of any of EEEs 1-11, the step of applying the time-varying mechanical force comprising deforming at least one of a cladding and a core of the fiber segment.
13. The method of any of EEEs 1-12, the fiber segment being embedded in an elastic material, the step of applying the time-varying mechanical force comprising applying the time-varying mechanical force to the elastic material.
14. The method of any of EEEs 1-13, the step of applying the time-varying mechanical force comprising inducing a time variation on modal noise of the laser light emitted by an output end of the multimode optical fiber.
15. The method of any of EEEs 1-14, further comprising, while applying the time-varying mechanical force:
    generating the laser light;
    coupling the laser light to an input end of the multimode optical fiber; and
    projecting at least a portion of the laser light emitted by an output end of the multimode optical fiber to form an image on a screen.
16. The method of EEE 15, further comprising, during the step of projecting, maintaining the output end at a stationary position relative to the input end.
17. The method of EEE 15 or EEE 16, the time-varying mechanical force having a temporal fundamental frequency exceeding sixty-five hertz.
18. A modal-noise mitigator comprising:
    an actuator configured to apply a time-varying mechanical force to a fiber segment of a multimode optical fiber in at least a first direction orthogonal to a fiber axis of the multimode optical fiber within the fiber segment.
19. The modal-noise mitigator of EEE 18, further comprising a fiber holder configured to maintain an output end of the multimode optical fiber at a position that is independent of the time-varying mechanical force.
20. The modal-noise mitigator of EEE 19, the position being stationary relative to an input end of the multimode optical fiber.
21. The modal-noise mitigator of any of EEEs 18-20, further comprising a support configured to hold the fiber segment, the support including an elastic coupler that mechanically couples the actuator to the fiber segment, such that the actuator is configured to apply the time-varying mechanical force to the multimode optical fiber via the elastic coupler.
22. The modal-noise mitigator of EEE 21, the elastic coupler at least partially surrounding the fiber segment, the actuator being configured to compress the fiber segment via application of the time-varying mechanical force.
23. The modal-noise mitigator of EEE 21 or EEE 22, the elastic coupler at least partially surrounding the fiber segment, the actuator being configured to bend the fiber segment via application of the time-varying mechanical force.

24. The modal-noise mitigator of any of EEEs 21-23, the elastic coupler having a thickness, between the fiber segment and the actuator, between twenty and thirty millimeters.

25. The modal-noise mitigator of any of EEEs 21-24, the elastic coupler being formed of a material having a Young's modulus between one kilopascal and ten megapascals.

26. The modal-noise mitigator of any of EEEs 21-25, the elastic coupler including a solid foam.

27. The modal-noise mitigator of any of EEEs 21-26, the time-varying mechanical force having a temporal fundamental frequency exceeding sixty-five hertz.

28. The modal-noise mitigator of any of EEEs 18-27, the actuator being further configured to apply two time-varying mechanical forces to the fiber segment in two respective non-parallel directions that are both orthogonal to the fiber axis.

29. A modal-noise mitigating fiber-relay, comprising:
the modal-noise mitigator of any of EEEs 18-28; and
the multimode optical fiber, the fiber segment being hermetically sealed.

30. A modal-noise mitigating fiber-relay, comprising:
the modal-noise mitigator of any of EEEs 18-28;
the multimode optical fiber; and
one or more fiber holders configured to fix positions of an input end and an output end, of the multimode optical fiber, relative to each other.

31. The modal-noise mitigating fiber-relay of EEE 30, the fiber segment being closer to the input end than the output end.

The invention claimed is:

1. A modal noise mitigation method for mitigating noise in a multimode optical fiber, comprising:
providing an elastic coupler comprising an elastic material and an enclosure at least partially surrounding the elastic material;
embedding a fiber segment of the multimode optical fiber within the elastic material; and
applying a first time-varying mechanical force to the elastic coupler such that a second time-varying mechanical force is applied, via the enclosure and the elastic material, to the fiber segment, wherein the second time-varying mechanical force is applied to the fiber segment in at least a first direction orthogonal to a fiber axis of the fiber segment and wherein the second time-varying mechanical force differs in at least one of amplitude, fundamental frequency and net direction from the first time-varying mechanical force.

2. The method of claim 1, further comprising, while applying the second time-varying mechanical force, maintaining an output end of the multimode optical fiber at a position that is independent of the second time-varying mechanical force.

3. The method of claim 2, in the step of maintaining, the position being stationary relative to an input end of the multimode optical fiber.

4. The method of claim 1, wherein the first time-varying mechanical force has a component in only one direction and the second time-varying mechanical force has two components in two respective non-parallel directions that are both orthogonal to the fiber axis.

5. The method of claim 4, wherein the step of applying the second time-varying mechanical force comprises dithering the fiber segment in each of the two non-parallel directions.

6. The method of claim 5, the dithering having an amplitude exceeding a core diameter of the optical fiber.

7. The method of claim 5, the dithering being in a first one of the two non-parallel directions during a first plurality of time intervals and in a second one of the two non-parallel direction during a second plurality of time intervals, the second plurality of intervals being interleaved with the first plurality of intervals.

8. The method of claim 1, the step of applying the second time-varying mechanical force comprising bending and/or compressing the fiber segment.

9. The method of claim 1, the step of applying the second time-varying mechanical force comprising deforming at least one of a cladding and a core of the fiber segment.

10. The method of claim 1, the step of applying the second time-varying mechanical force comprising inducing a time variation on modal noise of the laser light emitted by an output end of the multimode optical fiber.

11. The method of claim 1, further comprising, while applying the second time-varying mechanical force:
generating the laser light;
coupling the laser light to an input end of the multimode optical fiber; and
projecting at least a portion of the laser light emitted by an output end of the multimode optical fiber to form an image on a screen.

12. A modal-noise mitigator for mitigating noise in a multimode optical fiber, comprising:
an elastic coupler comprising an elastic material and an enclosure at least partially surrounding the elastic material, the elastic coupler configured for embedding a fiber segment of the multimode optical fiber;
an actuator configured to apply a first time-varying mechanical force to the elastic coupler such that a second time-varying mechanical force is applied, via the enclosure and the elastic material, to the fiber segment, wherein the second time-varying mechanical force is applied to the fiber segment in at least a first direction orthogonal to a fiber axis of the fiber segment and wherein the second time-varying mechanical force differs in at least one of amplitude, fundamental frequency and net direction from the first time-varying mechanical force.

13. The modal-noise mitigator of claim 12, wherein the enclosure has an oblique surface relative to a direction of the first time-varying mechanical force.

14. The modal-noise mitigator of claim 12, wherein the enclosure is a tube filled with the elastic material.

15. The modal-noise mitigator of claim 12, wherein the actuator and the fiber segment are separated, within the elastic coupler, by a distance.

16. The modal-noise mitigator of claim 12, wherein the elastic material comprises or is formed of, a solid foam, a gel or a combination thereof.

17. The modal-noise mitigator of claim 12, the elastic material having a Young's modulus between one kilopascal and ten megapascals.

18. The modal-noise mitigator of claim 12, further comprising a fiber holder configured to maintain an output end of the multimode optical fiber at a position that is independent of the second time-varying mechanical force.

19. The modal-noise mitigator of claim 18, the position being stationary relative to an input end of the multimode optical fiber.

20. The modal-noise mitigator of claim 12, the elastic coupler at least partially surrounding the fiber segment, the actuator being configured to compress and/or to bend the fiber segment via application of the first time-varying mechanical force.

21. The modal-noise mitigator of claim 12, the elastic coupler having a thickness, between the fiber segment and the actuator, between twenty and thirty millimeters.

22. The modal-noise mitigator of claim 12, the actuator being further configured to apply the first time-varying mechanical force with one component in only one direction such that, via modification of the elastic coupler, the second time-varying mechanical force has two components in two respective non-parallel directions that are both orthogonal to the fiber axis.

23. The modal-noise mitigator of claim 22, the actuator being configured to dither the fiber segment in a first one of the two non-parallel directions during a first plurality of time intervals and to dither the fiber segment in a second one of the two non-parallel directions during a second plurality of intervals, the second plurality of intervals being interleaved with the first plurality of intervals.

24. A modal-noise mitigating fiber-relay, comprising:
   the modal-noise mitigator of claim 12,
   the multimode optical fiber,
   a casing for hermetically sealing the fiber segment.

25. A modal-noise mitigating fiber-relay of claim 24, further comprising:
   one or more fiber holders configured to fix positions of an input end and an output end, of the multimode optical fiber, relative to each other.

* * * * *